Dec. 24, 1929.  M. W. MORGAN  1,740,617
FLEXIBLE COUPLING
Filed Nov. 30, 1927
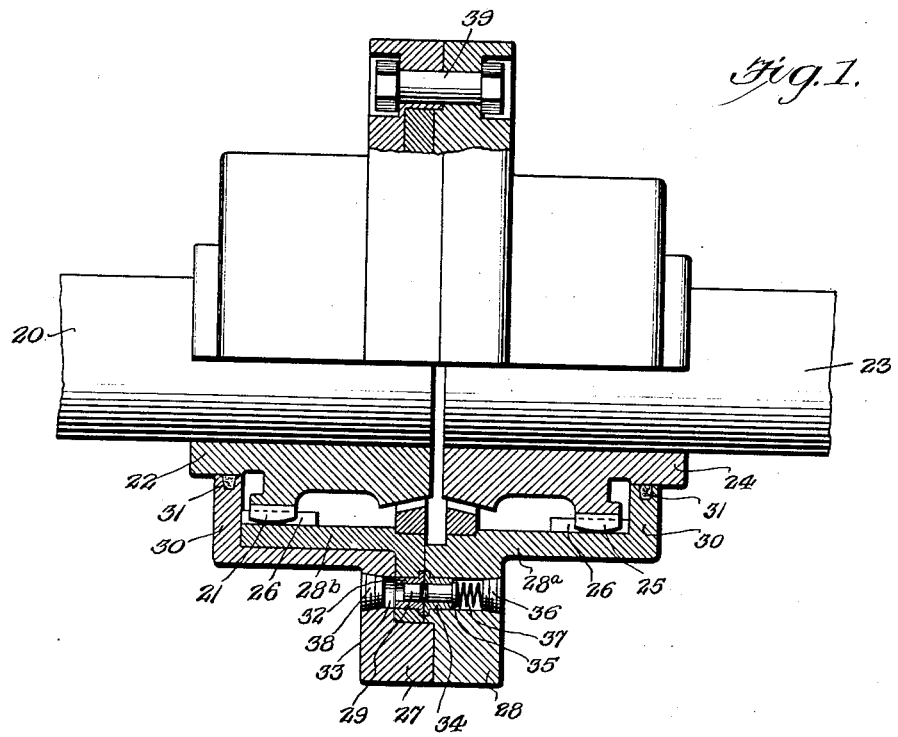
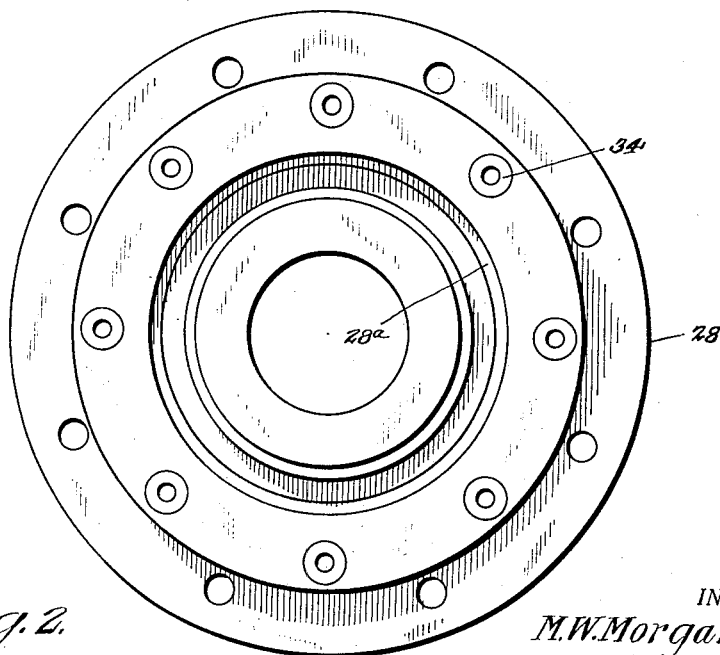
Fig. 1.
Fig. 2.
INVENTOR.
M. W. Morgan,
BY
ATTORNEYS Patented Dec. 24, 1929

1,740,617

UNITED STATES PATENT OFFICE

MERTON W. MORGAN, OF BALTIMORE, MARYLAND, ASSIGNOR TO POOLE ENGINEERING AND MACHINE COMPANY, OF BALTIMORE, MARYLAND, A CORPORATION OF MARYLAND

FLEXIBLE COUPLING

Application filed November 30, 1927. Serial No. 236,799.

This invention relates to improvements in shaft couplings and particularly to a flexible shaft coupling.

In connection with couplings of this type it has heretofore been proposed to couple the driving shaft with the driven shaft in such fashion that the coupling will become inoperative upon a predetermined load being imposed upon the driven member so that when such a load is imposed upon the driven shaft the latter may remain idle while the driving shaft continues to rotate.

In some of those prior instances the means for actually affecting the coupling together of the shafts consists of a series of breaking or shearing pins which are so arranged that they are rather inaccessible, it being necessary to disassemble the coupling to insert new breaking pins when the former ones have been ruptured by the predetermined load having been placed on the driven shaft. In some of those prior structures the coupling comprises members which rotate one upon another after the breaking pins are ruptured and there being no provision for lubricating the surfaces of such relative moving parts comparatively heavy wear is imposed thereon so long as the driving shaft rotates and the driven shaft remains stationary.

In view of the foregoing the present invention seeks to provide a coupling wherein the breaking pins through which motion is transmitted from one shaft to another are accessible from the exterior of the coupling so that, if the pins become broken they may be quickly displaced and new pins substituted therefor.

A further object of the invention is to provide a coupling wherein all moving parts are thoroughly lubricated so long as either shaft is rotated.

With these and other objects in view, the invention consists in certain novel details of construction, combination and arrangement of parts, all as will hereinafter be more fully described and the novel features thereof particularly pointed out in the appended claims.

In the accompanying drawings,—

Figure 1 is a sectional view longitudinally of the shafts.

Fig. 2 is an end view illustrating a portion of the coupling members and one of the shafts.

As shown in the accompanying drawings, driving shaft 20 is provided with a series of teeth, preferably by having such teeth 21 on a hub 22 mounted on said shaft. Driven shaft 23 also has a hub 24 thereon which is provided with teeth 25. The crowns of teeth 21, 25, are curved longitudinally of the shafts so as to afford a rocking bearing for a sleeve whose interior is formed with two series of teeth 26, teeth 21, 25, being adapted to engage between teeth on said sleeve. The provision of the rocking bearing for the sleeve is to permit the shafts to freely assume positions wherein they are misalined.

Preferably said sleeve consists of two sections 27, 28, bolted together by bolts 39 extending through flanges formed at the juxtaposed ends of said sections. At their remote ends said sections are provided with teeth 26 engaging teeth 21, 25 on the hubs. Said sections are also formed with end plates 30 each provided with suitable packing 31 to prevent entry of dirt and other extraneous material to the interior of the sleeve. In order that motion will be transmitted from driving shaft 20 to driven shaft 23 in such fashion that the latter may become automatically disconnected from the driving shaft in the event undue loads are imposed upon it, one of the sleeve sections is preferably formed of two separable portions one of which is connected to the other section by one or more breaking or shearing pins, so that as long as the breaking pin is not overstrained the two shafts will be connected. In the event, however, that an excessive load is placed upon the driven shaft 23 said breaking pin will be ruptured so that one portion of the separable section of the sleeve will remain stationary while the other separable section which is engaged with teeth 21 on driving shaft 20 will continue to rotate. As shown in the present instance the section of the coupling sleeve engaging the driving shaft is formed of two portions 27, 28$^b$ and portion 28$^b$ is normally connected to section 28 by one or more breakable pins 29 so that the entire sleeve assembly will rotate as a unit so long as breaking pin 29 remains unbroken.

It will be noted that separable portion 28$^b$ of section 27 takes a bearing on the interior surface of section 27 and when breaking pin 29 is ruptured, portion 28ᵇ of the sleeve whose teeth are engaged with the teeth 21 of the driving shaft will be rotated within sleeve section 27. However, the relative moving surfaces of portion 28ᵇ and section 27 will be amply lubricated because centrifugal force set up by the revolving shaft causes a film of lubricant to be forced between such surfaces. In accordance with the usual practice any suitable means may be provided for placing lubricant within the sleeve, the presence of such lubricant being necessary at all times for lubricating the teeth on the hubs and sleeve.

By having separable portion 28ᵇ of the sleeve of cylindrical formation with a radially, outwardly disposed flange 32 thereon which is received in the flange portion of section 27 the breaking pins for connecting together the separable sections 28ᵃ, 28ᵇ may be inserted from either side of the flange portions of the sleeve sections at the exterior of the sleeve. Preferably, a comparatively large hole 33 is formed through the flanges of the sleeve sections for each breaking pin and fitted into said holes are steel bushings 34 in which the breaking pin 29 is received. Said breaking pin is provided at one end with a head 35 and interposed between said head and the plug 36 in one end of hole 33 is a spring 37 which holds the breaking pin against accidental displacement. A similar plug 38 is provided at the opposite end of hole 33 and in this way loss of lubricant through the holes for the breaking pins is prevented.

As will be understood, the power from the driving to the driven shaft is transmitted entirely through these breaking pins, the material, size and number of pins being such that they will break at some predetermined load. When such predetermined load is reached when the pin is broken, it will be seen that portion 27 of the sleeve and section 28 of the sleeve will remain stationary with shaft 23 due to the engagement of teeth 26 with teeth 25 on hub 24. Portion 28ᵇ of sleeve section 27, however, will continue to rotate due to the engagement of its teeth 26 with teeth 21 on the hub 22 of driving shaft 20. Nevertheless, this relative motion between portion 28ᵇ and section 27 does not impose undue wear upon the parts because, as before mentioned, an ample supply of lubricant, in film-like form, is maintained between the surfaces of those parts. With the present arrangement it will also be seen that to replace the broken pins with new ones no parts of the coupling need be disassembled, it only being necessary to rotate one of the separable portions 28ᵃ, 28ᵇ with respect to the other until the holes for the breaking pins are brought into registry whereupon new pins may be inserted.

What I claim is:

1. In a shaft coupling, a pair of shafts, a series of teeth on each shaft, a sleeve composed of two sections one of which has two portions, one of said sections and a portion of the other section engaging said teeth to transmit motion from one shaft to the other, and a breakable element rigidly connecting one section with one of the separable portions of the other sleeve section adapted to be ruptured when a predetermined load is imposed on one of said shafts.

2. In a flexible shaft coupling, a driving shaft, a driven shaft, a hub on each shaft, a row of teeth on each hub, a sleeve composed of two sections one of which has two portions, teeth on each section engaging the teeth on said hubs to transmit motion from the driving to the driven shaft, and a breakable connection between one section and one of the portions of the other section adapted to be ruptured when a predetermined load is placed thereon, one portion of said last mentioned sleeve section being free to rotate with the driving shaft and the other portion being free to remain stationary with the driven shaft when said connection is broken.

3. In a flexible shaft coupling, a driving shaft, a driven shaft, a series of teeth carried by each shaft, a lubricant retaining sleeve formed of two sections, one of which is composed of two portions, teeth on said sleeve sections engaging the teeth on the shafts to transmit motion from the driving to the driven shaft, lubricant in said sleeve being distributed over the surfaces of said portions by centrifugal force when the shafts are rotated, and a breakable element connecting one of said sleeve portions with the other section adapted to be ruptured by the imposition of a predetermined load thereon.

4. In a flexible shaft coupling, a driving shaft, a driven shaft, a hub on each shaft, teeth on said hubs, a sectional sleeve, one section thereof being formed of two portions, teeth on one of said portions and on the other section engaging the hub teeth to transmit motion from the driving to the driven shaft, and a breakable pin rigidly connecting said toothed portion and said sleeve section adapted to be ruptured by the imposition of a predetermined load on said driven shaft.

5. In a flexible shaft coupling, a driving shaft, a driven shaft, a hub on each shaft, teeth on said hubs, a sectional sleeve, one section thereof being formed of two portions, teeth on one of said portions and on the other section engaging the hub teeth to transmit motion from the driving to the driven shaft, and a breakable pin rigidly connecting said toothed portion and sleeve section adapted to be ruptured by the imposition of a predetermined load on said driven shaft, one portion of said section of the sleeve being rotatable on the other portion thereof when said pin is ruptured.

6. In a flexible shaft coupling, a driving shaft, a driven shaft, a hub on each shaft, teeth on said hubs, a sectional sleeve, one section thereof being formed of two portions, teeth on one of said portions engaging the hub teeth of the driving shaft, teeth on the other section engaging the teeth on the driven hub to transmit motion from the driving to the driven shaft, and a breakable pin rigidly connecting one of said portions and the other sleeve section adapted to be ruptured by the imposition of a predetermined load on said driven shaft, one portion of said section of the sleeve being rotatable on the other portion thereof when said pin is ruptured, and means for supplying lubricant between the frictional surfaces of the two portions of said section.

MERTON W. MORGAN.